(12) United States Patent
Katsuta

(10) Patent No.: US 8,769,773 B2
(45) Date of Patent: Jul. 8, 2014

(54) OPENING AND CLOSING DEVICE

(75) Inventor: Tetsuya Katsuta, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 4 days.

(21) Appl. No.: 13/811,713

(22) PCT Filed: Jul. 20, 2011

(86) PCT No.: PCT/JP2011/066422
§ 371 (c)(1),
(2), (4) Date: Mar. 1, 2013

(87) PCT Pub. No.: WO2012/014742
PCT Pub. Date: Feb. 2, 2012

(65) Prior Publication Data
US 2014/0026368 A1    Jan. 30, 2014

(30) Foreign Application Priority Data
Jul. 26, 2010    (JP) ................. 2010-167444

(51) Int. Cl.
*E05D 15/00* (2006.01)
*E05F 1/08* (2006.01)

(52) U.S. Cl.
USPC ............... 16/362; 16/363; 16/366; 16/286; 16/294

(58) Field of Classification Search
CPC ... G06F 1/1616; G06F 1/1679; G06F 1/1681; H05K 5/0226; E05D 3/122; E05D 3/12; E05D 3/16; E05D 3/18; E05D 3/06; E05D 3/32; E05D 11/1021; E05D 11/1078; E05Y 2900/20; E05Y 2900/60; E05Y 2900/606; E04M 1/022; E04M 1/0214; E04M 1/0216
USPC .......... 16/327, 331, 333, 338, 340, 366, 354, 16/357, 360, 346, 345, 368, 369, 286, 291, 16/293, 294, 296; 361/679.08, 679.11, 361/679.02, 679.15, 679.27, 679.21, 361/679.09, 679.22; 455/90.3, 575.1, 455/575.3, 575.8; 379/433.12, 433.13; 348/373, 333.01, 333.06, 794; 248/274.1, 284.1, 286.1, 287.1, 419, 248/420

See application file for complete search history.

(56) References Cited

U.S. PATENT DOCUMENTS 4,859,092 A * 8/1989 Makita ........................ 400/83
4,960,256 A * 10/1990 Chihara et al. ............. 248/286.1

(Continued)

FOREIGN PATENT DOCUMENTS

| EP | 2120426 A1 * | 11/2009 |
| JP | 2007-166621 | 6/2007 |

(Continued)

OTHER PUBLICATIONS

International Search Report mailed on Aug. 30, 2011.

*Primary Examiner* — Chuck Mah
(74) *Attorney, Agent, or Firm* — IPUSA, PLLC

(57) ABSTRACT

An opening and closing device includes a fixed frame including a shaft receiving part and fixed to a first housing, a movable plate configured to be rotationally movable relative to the fixed frame, a slide plate configured to be slidable relative to the movable plate and fixed to a second housing, multiple arms of the same length provided between the shaft receiving part and the movable plate to have respective one ends received by the shaft receiving part and respective other ends received by the movable plate, and a slide mechanism configured to cause the slide plate to slide relative to the movable plate. The slide plate is caused to slide relative to the movable plate by the slide mechanism and the movable plate rotates relative to the fixed frame with turns of the arms, so that the second housing moves between a closed position and an open position.

3 Claims, 14 Drawing Sheets

(56) References Cited

U.S. PATENT DOCUMENTS

| | | | |
|---|---|---|---|
| 5,103,376 A * | 4/1992 | Blonder | 361/679.09 |
| 7,187,538 B2 * | 3/2007 | Homer et al. | 361/679.21 |
| 7,500,287 B2 * | 3/2009 | Brustle | 16/286 |
| 7,725,988 B2 * | 6/2010 | Kim et al. | 16/361 |
| 8,250,711 B1 * | 8/2012 | Chen et al. | 16/354 |
| 2007/0197270 A1 | 8/2007 | Kim | |
| 2008/0189908 A1 * | 8/2008 | Lowry et al. | 16/231 |
| 2008/0196201 A1 * | 8/2008 | Anderson | 16/232 |
| 2009/0061963 A1 | 3/2009 | Miyaoka | |
| 2010/0188350 A1 | 7/2010 | Sawada | |
| 2010/0291979 A1 * | 11/2010 | Jeong et al. | 455/575.4 |
| 2010/0299873 A1 * | 12/2010 | Song | 16/236 |
| 2012/0217855 A1 * | 8/2012 | Chen et al. | 312/323 |
| 2012/0328222 A1 * | 12/2012 | Chen et al. | 384/26 |

FOREIGN PATENT DOCUMENTS

| | | |
|---|---|---|
| JP | 2008-301244 | 12/2008 |
| JP | 2009-059102 | 3/2009 |
| JP | 2009-071588 | 4/2009 |
| JP | 2009-218674 | 9/2009 |
| WO | WO 2011/052553 | 5/2011 |

* cited by examiner

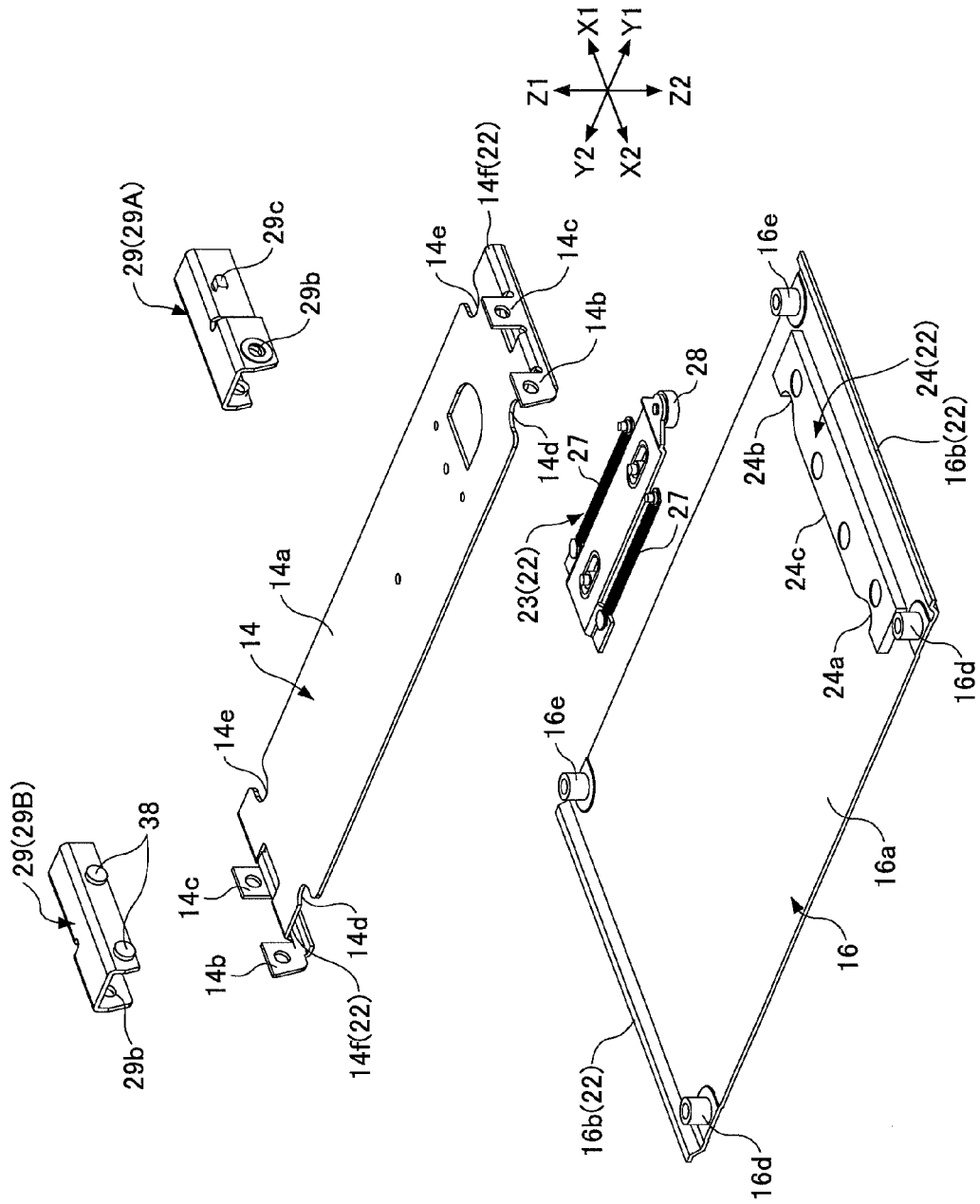

OPENING AND CLOSING DEVICE

TECHNICAL FIELD

The present invention relates to opening and closing devices, and more particularly to an opening and closing device that allows a first housing and a second housing to be opened in a so-called full-flat manner.

BACKGROUND ART

In general, portable terminal apparatuses include a first housing (fixed plate) provided with numeric keys and the like and a second housing (movable plate) provided with a liquid crystal display unit and the like and allowed to be opened and closed relative to the first housing. Further, common structures for causing the second housing to be opened and closed relative to the first housing include those of a type that connects the first housing and the second housing with a hinge mechanism and causes the second housing to be opened and closed by rotating the second housing relative to the first housing (a folding type) and those of a type that causes the second housing to be opened and closed by sliding the second housing relative to the first housing (a sliding type).

Recent portable terminal apparatuses have become more and more multifunctional, and apparatuses have been provided that are capable of receiving a terrestrial digital broadcast. Liquid crystal display units have also become larger in size. Further, with an increase in the number of functions, the number of keys of a keyboard for making inputs to portable terminal apparatuses also tends to increase, so that the keyboard also tends to become larger in size. Meanwhile, a constant demand for improvement in the portability of portable terminal apparatuses does not allow an unlimited increase in the sizes of liquid crystal display units and keyboards.

The above-described folding-type portable terminal apparatus has a problem in that it is impossible to use a liquid crystal display unit when the portable terminal apparatus is folded because the liquid crystal display unit is hidden when the portable terminal apparatus is folded. While the above-described problem of the folding-type portable terminal apparatus does not occur in the sliding-type portable terminal apparatus, the sliding-type portable terminal apparatus has a problem in that the first housing and the second housing inevitably overlap each other when the portable terminal apparatus is unfolded, thus preventing effective use of space.

Therefore, opening and closing devices have been proposed that cause the first housing and the second housing to be in the same plane (flat) when the first housing and the second housing are opened (see Patent Documents 1 through 3). According to this configuration, it is possible to use a liquid crystal display unit even when the first housing and the second housing are closed, and when the first housing and the second housing are opened, there is no overlap between both housings, so that it is possible to make effective use of space.

PRIOR ART DOCUMENTS

Patent Documents

[Patent Document 1] Japanese Laid-Open Patent Application No. 2009-218674
[Patent Document 2] Japanese Laid-Open Patent Application No. 2009-059102
[Patent Document 3] Japanese Laid-Open Patent Application No. 2009-071588

SUMMARY OF THE INVENTION

Problems to be Solved by the Invention

However, according to the opening and closing device disclosed in Patent Document 1, the second housing is moved relative to the first housing with a single arm, so that there is a problem in that the second housing freely rotates during the movement, which makes the moving operation unstable.

Further, the opening and closing devices disclosed in Patent Documents 2 and 3, which require two operations at the time of performing opening and closing operations, that is, a sliding operation that slides the second housing relative to the first housing and a raising and lowering operation that vertically moves the second housing relative to the first housing, have a problem in that the opening and closing operations are troublesome.

Means for Solving the Problems

The present invention has a general object of providing an improved, useful opening and closing device that solves the above-described conventional problems.

A more particular object of the present invention is to provide an opening and closing device that enables a stable and smooth movement of the second housing between a closed position and an open position with a single operation.

In order to achieve these objects, an opening and closing device according to the present invention includes a fixed frame including a shaft receiving part and fixed to a first housing, a movable plate configured to be rotationally movable relative to the fixed frame, a slide plate configured to be slidable relative to the movable plate and fixed to a second housing, a plurality of arms of a same length provided between the shaft receiving part and the movable plate to have respective one ends received by the shaft receiving part and respective other ends received by the movable plate, and a slide mechanism configured to cause the slide plate to slide relative to the movable plate, wherein the slide plate is caused to slide relative to the movable plate by the slide mechanism and the movable plate rotates relative to the fixed frame with turns of the arms, so that the second housing moves between a closed position where the second housing is superposed on the first housing and an open position where the second housing and the first housing are flat.

Further, in the above-described invention, the arms may be provided parallel to each other between the shaft receiving part and the movable plate.

Further, in the above-described invention, at least one of the arms may be provided with a first semiautomatic mechanism configured to apply an urging force in a backward direction until turning the arms from the closed position or the open position to a predetermined reversing position and to apply an urging force in a forward direction when the arms pass the reversing position.

Further, in the above-described invention, the slide mechanism may be provided with a second semiautomatic mechanism configured to apply an urging force in a backward direction until sliding the slide plate from a slide start position to a predetermined reversing position and to apply an urging force in a forward direction when the slide plate passes the reversing position.

Effects of the Invention

According to the present invention, it is possible to cause a second housing to be stably opened and closed relative to a first housing while keeping the second housing parallel to the first housing, and to cause the second housing to move between a closed position and an open position by a single operation.

BRIEF DESCRIPTION OF THE DRAWINGS

FIG. 3 is an exploded perspective view for illustrating a slide mechanism of the opening and closing device that is an embodiment of the present invention.

Figure 1:
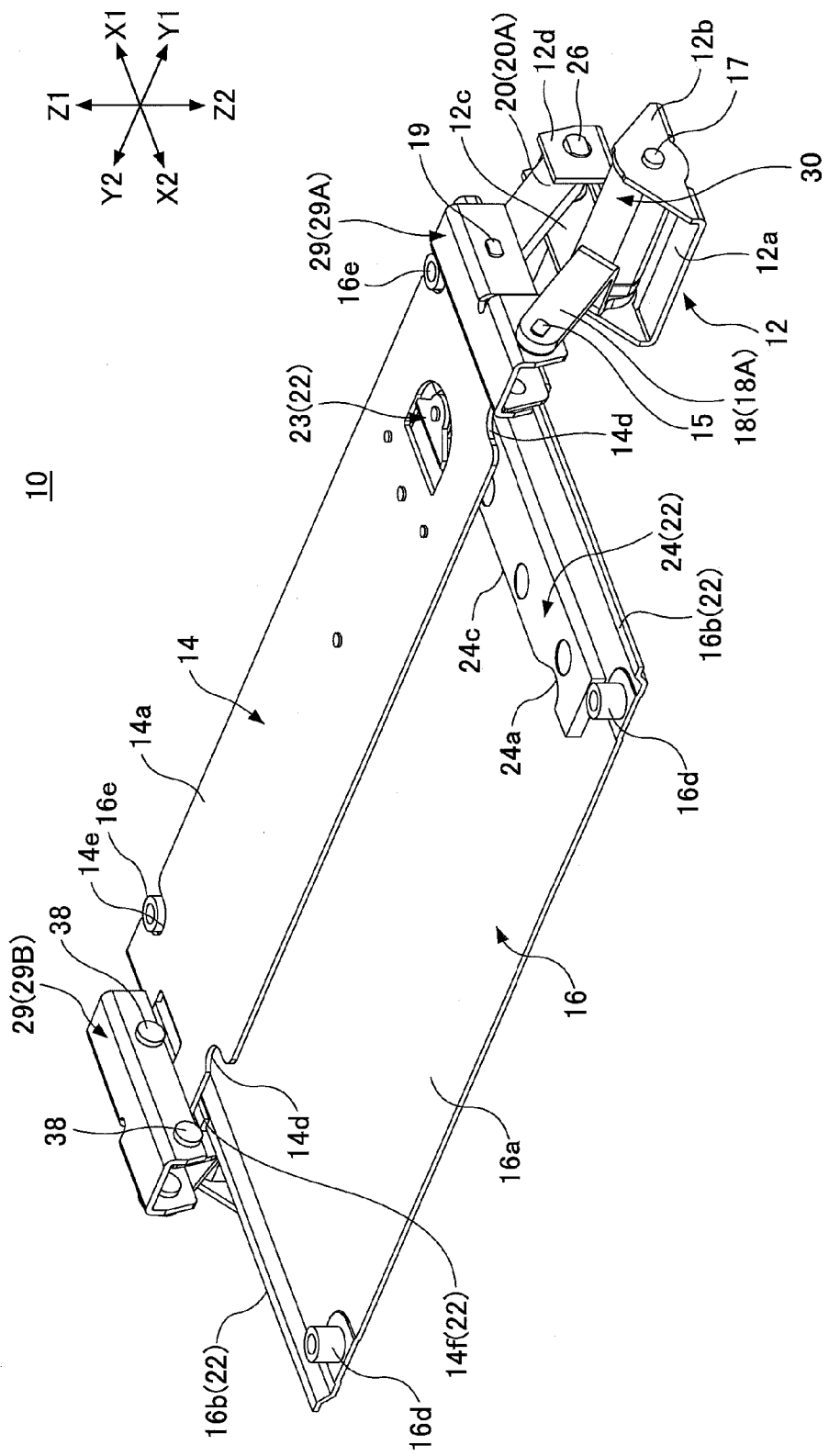
FIG. 1 is a perspective view of an opening and closing device that is an embodiment of the present invention.

DESCRIPTION OF THE REFERENCE NUMERALS 1 electronic apparatus
2 first housing
3 second housing
10 opening and closing device
12 fixed frame
14 movable plate
14a body part
14b, 14c connecting part
14d, 14e stopper groove
14f slide groove
16 slide plate
16a body part
16b slide part
16d, 16e stopper
18 first link arm
20 second link arm
22, 42, 52, 62 slide mechanism
23, 63 spring unit
24, 44 cam plate
24a, 24b, 44a, 44b cam groove
24c, 44c cam surface
26 link shaft
27 coil spring
28 roller
29 connecting member
30 hinge unit
53, 64 wire spring
54 roller
55 slide guide

DESCRIPTION OF EMBODIMENTS

A description is given below, with reference to the drawings, of embodiments of the present invention.

Figure 2:
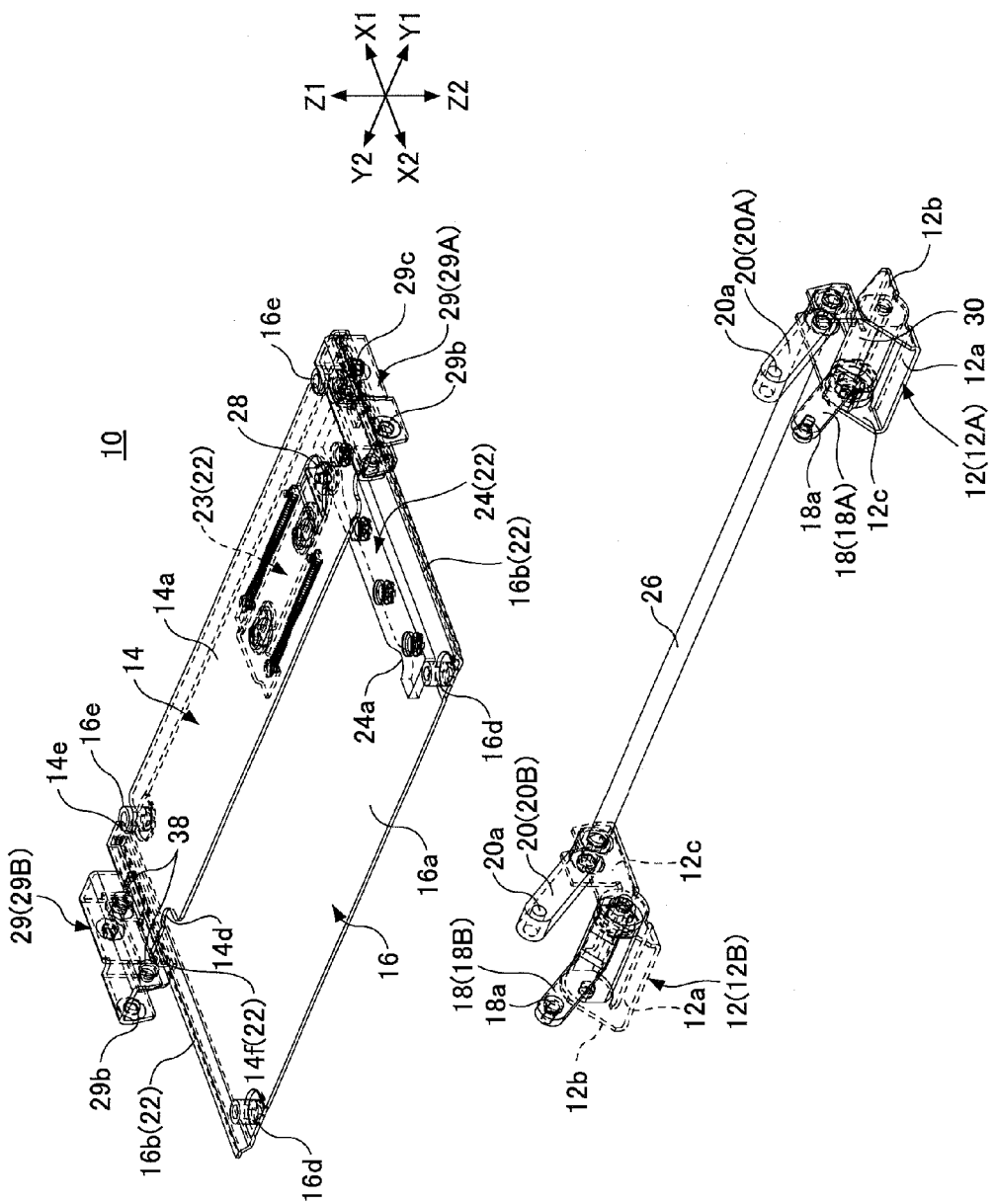
FIG. 2 is an exploded perspective view of the opening and closing device that is an embodiment of the present invention.

FIG. 1 through FIG. 3 are diagrams for illustrating an opening and closing device 10 that is an embodiment of the present invention. FIG. 1 is a perspective view of the opening and closing device 10, FIG. 2 is an exploded perspective view of the opening and closing device 10, and FIG. 3 is an exploded perspective view for illustrating a slide mechanism 22 and the like of the opening and closing device 10.

Figure 7A:
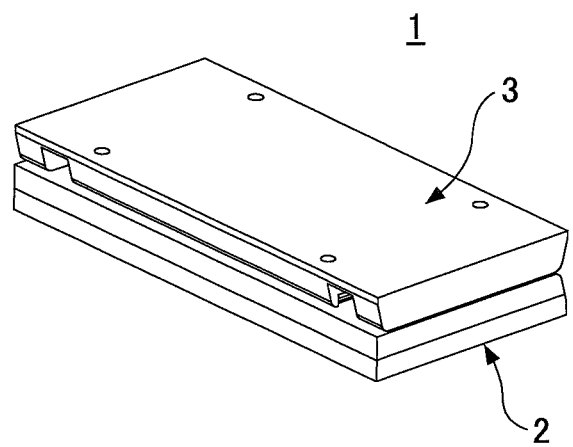
FIG. 7A is a diagram for illustrating an operation of the opening and closing device that is an embodiment of the present invention, and is a perspective view illustrating the closed state of the slide plate.
Figure 7B:
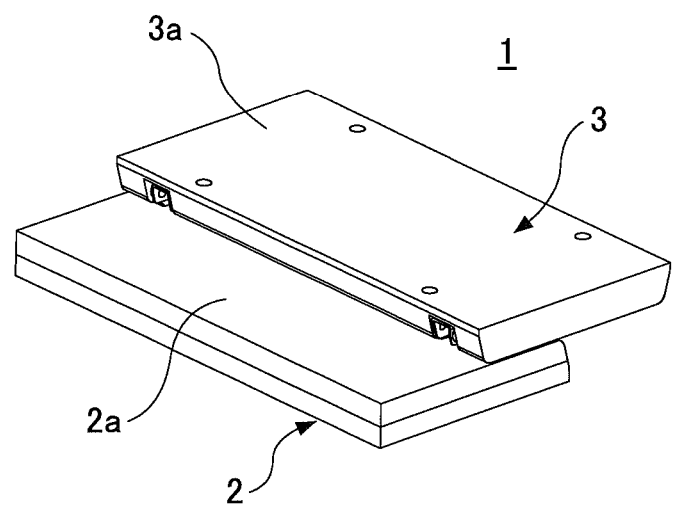
FIG. 7B is a diagram for illustrating the operation of the opening and closing device that is an embodiment of the present invention, and is a perspective view illustrating the state where the slide plate is at the first intermediate position.

The opening and closing device 10 according to this embodiment is applied to, for example, an electronic apparatus 1 as illustrated in FIG. 7A. The electronic apparatus 1, which is a portable terminal apparatus, includes a first housing 2, a second housing 3, and the opening and closing device 10 according to this embodiment. A keyboard, a liquid crystal display unit, etc., are provided on an upper surface 2a of the first housing 2. A liquid crystal display unit, etc., are provided on an upper surface 3a of the second housing 3.

The portable terminal apparatus needs to be smaller in shape to improve its carriage-time portability. Therefore, the electronic apparatus 1 according to this embodiment is provided with the opening and closing device 10 to cause the second housing 3 to slide between a closed position and an open position relative to the first housing 2.

Figure 7C:
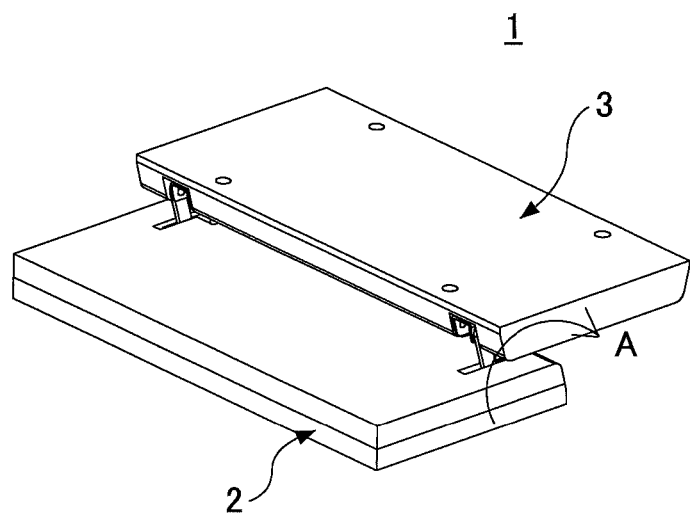
FIG. 7C is a diagram for illustrating the operation of the opening and closing device that is an embodiment of the present invention, and is a perspective view illustrating the state where the slide plate is at the second intermediate position.
Figure 7D:
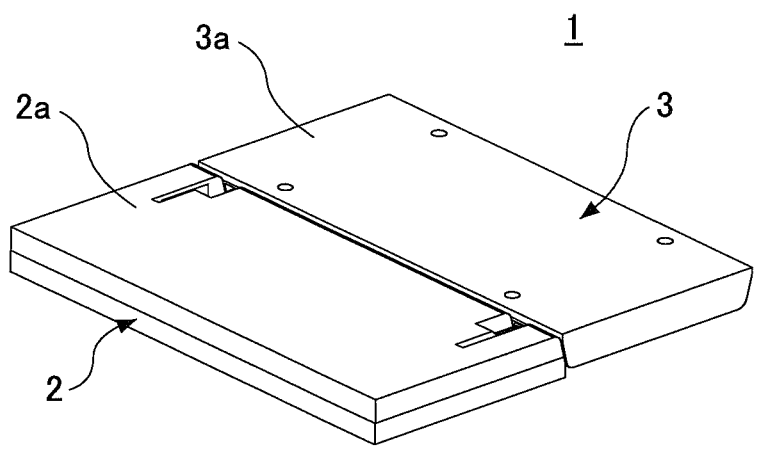
FIG. 7D is a diagram for illustrating the operation of the opening and closing device that is an embodiment of the present invention, and is a perspective view illustrating the open state of the slide plate.

FIG. 7A illustrates a state where the second housing 3 is at the closed position (hereinafter referred to as a closed state), and FIG. 7D illustrates a state where the second housing 3 is at the open position (hereinafter referred to as an open state). In the closed state, the second housing 3 is superposed on top of the first housing 2. Further, according to this embodiment, the first housing 2 and the second housing 3 have the same shape in a plan view, so that the area of the electronic apparatus 1 in a plan view in the closed state is half the area of the electronic apparatus 1 in a plan view in the open state. Accordingly, in the closed state, the electronic apparatus 1 is small in shape so that its portability is ensured.

Meanwhile, in the open state, as described in detail below, the second housing 3 is moved from the closed position to the open position to be maintained with the upper surface 2a of the first housing 2 and the upper surface 3a of the second housing 3 being positioned at the same level by the opening and closing device 10. In this open state, as illustrated in FIG. 7D, the first housing 2 and the second housing 3 are arranged side by side in the same plane without overlapping each other.

In this open state, the housings 2 and 3 do not overlap each other, and the entire upper surfaces 2a and 3a of the housings 2 and 3 are exposed upward. Accordingly, it is possible to use the entire upper surface 2a of the first housing 2 and the entire upper surface 3a of the second housing 3 as positions for installation of components of the electronic apparatus 1.

Thus, in the electronic apparatus 1 provided with the opening and closing device 10 according to this embodiment, it is possible to use the entire upper surface 2a of the first housing 2 and the entire upper surface 3a of the second housing 3 as positions for installation of components of the electronic apparatus 1. Therefore, it is possible to improve the efficiency of use of space of each of the housings 2 and 3.

Next, a description is given of the opening and closing device 10 that enables the above-described operations of the first housing 2 and the second housing 3.

As illustrated in FIG. 1 through FIG. 3, the opening and closing device 10 includes fixed frames 12, a movable plate 14, a slide plate 16, first link arms 18, second link arms 20, and the slide mechanism 22. First, a description is given of the fixed frames 12.

The fixed frames 12 are fixed to the first housing 2 of the electronic apparatus 1. The fixed frames 12 are formed by press-molding a plate-shaped metal material, and each have a unitary structure formed of a base part 12a fixed to the first housing 2 and shaft receiving parts 12b, 12c, and 12d formed by bending on end portions of the base part 12a.

Each of the shaft receiving parts 12b, 12c, and 12d is bent at a substantially right angle to the base part 12. The first link arm 18 to be described below is connected to a shaft pin 17 received between the shaft receiving part 12b and the shaft receiving part 12c. Further, the second link aim 20 to be described below is connected to a link shaft 26 received by the shaft receiving part 12c and the shaft receiving part 12d. Therefore, shaft holes into which the shaft pin 17 and the link shaft 26 are inserted are formed in the shaft receiving parts 12b, 12c, and 12d.

According to this embodiment, the two fixed frames 12 are provided, and are spaced apart from each other in the directions of arrows Y1 and Y2 in the drawings. In the following description, in the case where the fixed frames 12 spaced apart in the Y1 and the Y2 direction need to be described individually, the fixed frame 12 on the Y1 direction side is indicated as the fixed frame 12A, and the fixed frame 12 on the Y2 direction side is indicated as the fixed frame 12B.

Further, with respect to the below-described individual components of the opening and closing device 10 as well, a description is given with "A" added to the symbol of a component provided on the Y1 direction side on an as-needed basis and "B" added to the symbol of a component provided on the Y2 direction side on an as-needed basis. The fixed frames 12A and 12B does not always have to be separated in two, and the fixed frames 12A and 12B may be unitarily formed by connecting their respective base parts 12a.

Next, a description is given of the movable plate 14.

The movable plate 14 is formed by press-molding a plate-shaped metal material, and includes a body part 14a, connecting parts 14b and 14c, and slide grooves 14f as illustrated in FIG. 3. The body part 14a is a plate-shaped member that is elongated in the directions of arrows Y1 and Y2 in the drawing. The connecting parts 14b and 14c and the slide grooves 14f are unitarily formed with the body part 14a on end portions (end portions in the Y1 and the Y2 direction) of the body part 14a.

The connecting parts 14b and 14c are bent upward (in the direction of arrow Z1 in the drawing) at a right angle to the body part 14a. Connecting members 29 (29A and 29B) to be described below are provided on the connecting parts 14b and 14c. Further, stopper grooves 14d and 14e are formed at positions near the four corners of the body part 14a. The stopper grooves 14d and 14e are semicircular grooves, and are formed in correspondence to positions at which stoppers 16d and 16e to be described below are provided.

The slide grooves 14f are angular C-shaped grooves formed at end portions of the body part 14a. These slide grooves 14f are formed by first bending downward and then further bending inward the end portions of the body part 14a. Slide parts 16b of the slide plate 16 to be described below are slidably attached to these slide grooves 14f.

The connecting members 29 (29A and 29B) are provided on the above-described connecting parts 14b and 14c. The connecting members 29 are formed by bending a metal plate material into C-letter shape. The connecting members 29 are fixed to the connecting parts 14b and 14c using fixing members 38.

Further, shaft holes 29b and 29c are formed in sides of the connecting members 29. Upper end portions of the first link arms 18 are rotatably connected to the shaft holes 29b. Specifically, shaft holes 18a formed in the upper end portions of the first link arms 18 and the shaft holes 29b formed in the connecting members 29 are aligned, and shaft pins 15 are inserted into the shaft holes 18a and 29b to be fixed to the connecting members 29, so that the first link arms 18 are turnably connected to the movable plate 14 via the connecting members 29.

Further, upper end portions of the second link arms 20 are turnably connected to the shaft holes 29c. Specifically, shaft holes 20a formed in the second link arms 20 and the shaft holes 29c formed in the connecting members 29 are aligned, and shaft pins 19 are inserted into the shaft holes 20a and 29c to be fixed to the connecting members 29, so that the second link arms 20 are turnably connected to the movable plate 14 via the connecting members 29.

Next, a description is given of the slide plate 16.

The slide plate 16 is formed by press-molding a plate-shaped metal material, and is fixed to the second housing 3 of the electronic apparatus 1. Further, the slide plate 16 is movably attached to the movable plate 14. Specifically, the slide plate 16 may be caused to slide in the directions of arrows X1 and X2 in the drawings relative to the movable plate 14 by the slide mechanism 22.

The slide plate 16 includes a body part 16a, the slide parts 16b, and the stoppers 16d and 16e. The body part 16a is a plate-shaped metal member having a rectangular shape. Sides of the body part 16a in the Y1 direction and the Y2 direction in the drawings are bent stepwise so that the slide parts 16b are formed.

The stoppers 16d and 16e are provided at the four corner positions of the body part 16a. These stoppers 16d and 16e are columnar projections provided to stand from the body part 16a. The stoppers 16d are provided on the body part 16a on its X2 direction side, and the stoppers 16e are provided on the body part 16b on its X1 direction side.

As described above, the slide plate 16 moves in the X1 and the X2 direction relative to the movable plate 14. The stopper grooves 14d and 14e provided on the movable plate 14 and the stoppers 16d and 16e provided on the slide plate 16 serve as a movement range limiting mechanism that limits the movement range of the slide plate 16 relative to the movable plate 14.

That is, when the slide plate 16 moves in the X1 direction relative to the movable plate 14, the stoppers 16d come into contact with the stopper grooves 14d to prevent the slide plate 16 from sliding further in the X1 direction. When the slide plate 16 moves in the X2 direction relative to the movable plate 14, the stoppers 16e come into contact with the stopper grooves 14e to prevent the slide plate 16 from sliding further in the X2 direction. This makes it possible to prevent an excessive slide of the slide plate 16, so that it is possible to improve the stability of the opening and closing device 10.

As described above, the stoppers 16d and 16e come into contact with the stopper grooves 14d and 14e. Therefore, in order to reduce hitting sound at the time of contact, it is desirable to provide a buffer member on the periphery of the stoppers 16d and 16e.

Next, a description is given of the slide mechanism 22.

The slide mechanism 22 exerts a function of causing the slide plate 16 to slide in the X1 and the X2 direction relative to the movable plate 14. The slide mechanism 22 includes the slide grooves 14f formed on the movable plate 14, the slide parts 16b formed on the slide plate 16, a spring unit 23, and a cam plate 24.

As described above, the slide parts 16b formed on both sides (sides on the Y1 direction side and the Y2 direction side) of the slide plate 16 are configured to slidably engage with the slide grooves 14f formed in an angular C-letter shape on the movable plate 14. Therefore, the slide plate 16 slides in the X1 and the X2 direction relative to the movable plate 14.

The spring unit 23 is fixed to the rear surface (the surface on the side of arrow Z2) of the movable plate 14. This spring unit 23 includes a roller 28 and coil springs 27. The spring unit 23 is configured to urge the roller 28 in the direction of arrow Y1 in the drawings with the elastic forces of the coil springs 27.

The cam plate 24 is fixed to the upper surface (the surface on the side of arrow Z1) of the slide plate 16. The cam plate 24 is provided to extend in the X1 and the X2 direction along the Y1 direction side of the slide plate 16. Cam grooves 24a and 24b and a cam surface 24c are formed on the cam plate 24. The cam grooves 24a and 24b are spaced apart in the X1 and the X2 direction on the cam plate 24. The cam surface 24c is between these paired cam grooves 24a and 24b. According to this embodiment, the cam surface 24c is a linear cam shape without irregularities in a plane direction.

The above-described spring unit 23 is configured so that its roller 28 engages with the cam groove 24a or 24b or the cam surface 24c with the slide plate 16 being attached to the movable plate 14. That is, the roller 28 provided in the spring unit 23 is configured to be pressed against the cam plate 24 by the elastic forces of the coil springs 27.

A position at which the cam groove 24a and the roller 28 of the spring unit 23 engage with each other is so determined as to correspond to a position at which the stopper grooves 14d and the stoppers 16d come into contact with each other when the slide plate 16 moves in the X1 direction relative to the movable plate 14. Further, a position at which the cam groove 24b and the roller 28 of the spring unit 23 engage with each other is so determined as to correspond to a position at which the stopper grooves 14e and the stoppers 16e come into contact with each other when the slide plate 16 moves in the X2 direction relative to the movable plate 14.

Accordingly, when the slide plate 16 moves to a slide limit position in the X1 direction relative to the movable plate 14, or when the slide plate 16 moves to a slide limit position in the X2 direction relative to the movable plate 14, the feeling of a click may be obtained by the engagement of the roller 28 of the spring unit 23 with the cam groove 24a or the cam groove 24b.

Further, when the roller 28 of the spring licit 23 moves between the cam groove 24a and the cam groove 24b of the cam plate 24, the roller 28 is pressed against the cam surface 24c by the elastic forces of the coil springs 27 of the spring unit 23 as described above. This causes the slide plate 16 to be pressed in the Y1 direction relative to the movable plate 14. By thus causing the slide plate 16 to be pressed in the Y1 direction relative to the movable plate 14, it is possible to prevent backlash from occurring when the slide plate 16 slides relative to the movable plate 14. Further, pressing the roller 28 against the cam surface 24c applies a load. in sliding the slide plate 16 relative to the movable plate 14, so that it is possible to stop the slide plate 16 at any position (any position on the cam surface 24c) relative to the movable plate 14 (in other words, it is possible to perform a so-called free stop).

Next, a description is given of the first link arms 18 and the second link arms 20.

The first link arms 18 have respective upper end portions turnably connected to the connecting members 29 by the shaft pins 15. The connecting members 29 are fixed to the movable plate 14. Therefore, the upper end portions of the first link arms 18 are turnable relative to the movable plate 14. Further, the first link arms 18 have respective lower end portions connected to the shaft receiving parts 12b and 12c of the fixed frames 12 by the shaft pins 17. Therefore, the lower end portions of the first link arms 18 are turnable relative to the shaft receiving parts 12b and 12c of the fixed frames 12.

The second link arms 20 have respective upper end portions turnably connected to the connecting members 29 by the shaft pins 19, so that the upper end portions of the second link arms 20 are turnable relative to the movable plate 14. Further, the second link arms 20 have respective lower end portions connected to the shaft receiving parts 12b and 12c of the fixed frames 12 by the link shaft 26. Therefore, the lower end portions of the second link arms 20 are turnable relative to the shaft receiving parts 12b and 12c of the fixed frames 12.

Thus, according to this embodiment, the multiple (two in this embodiment) first and second link arms 18 and 20 are provided between the shaft receiving parts 12b and 12c of the fixed frames 12 and the slide plate 16. Further, these first and second link arms 18 and 20 are provided parallel to each other between the shaft receiving parts 12b and 12c of the fixed frames 12 and the slide plate 16.

Figure 5A:
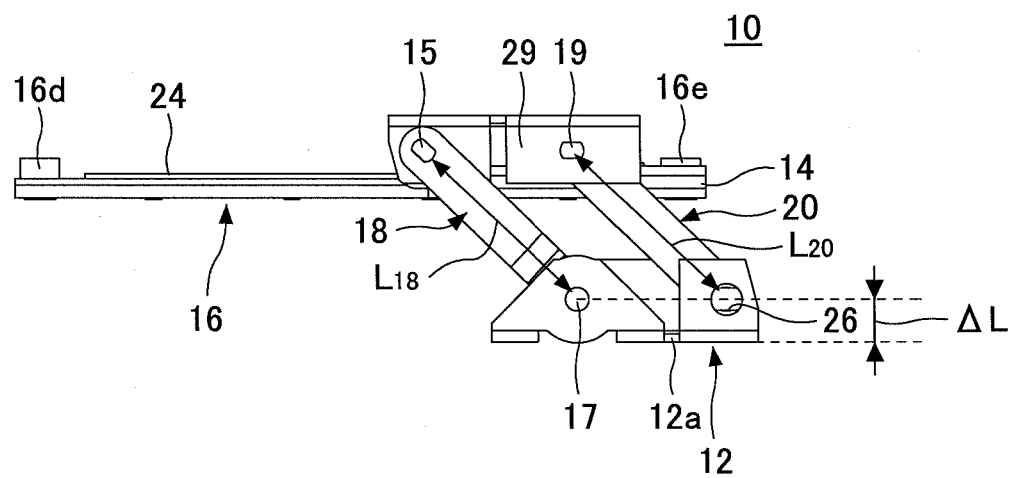
FIG. 5A is a diagram for illustrating an operation of the opening and closing device that is an embodiment of the present invention, and is a side view illustrating the closed state of the slide plate.
Figure 5B:
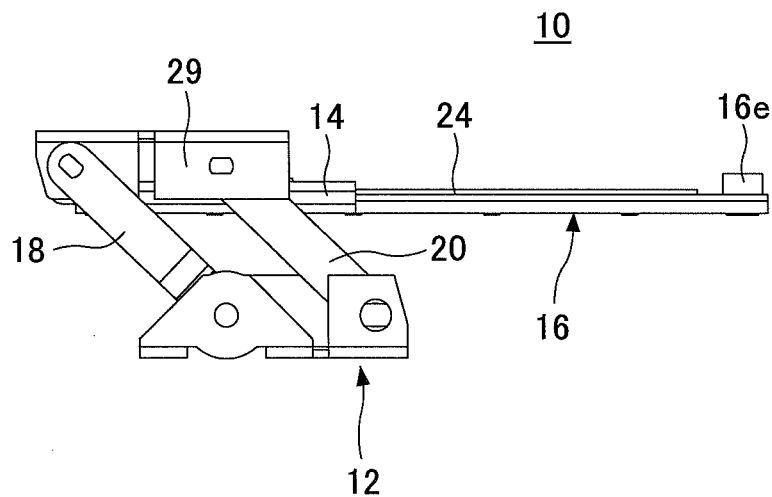
FIG. 5B is a diagram for illustrating the operation of the opening and closing device that is an embodiment of the present invention, and is a side view illustrating the state where the slide plate is at the first intermediate position.

Further, the first link arms 18 and the second link arms 20 are equal in length. Specifically, a distance between a position at which the first link anus 18 are received by the shaft pins 15 and a position at which the first link arms 18 are received by the shaft pins 17 in the first link arms 18 (indicated by arrow $L_{18}$ in FIG. 5A) and a distance between a position at which the second link arms 20 are received by the shaft pins 19 and a position at which the second link arms 20 are received by the link shaft 26 in the second link arms 20 (indicated by arrow $L_{20}$ in FIG. 5A) are determined to be equal ($L_{18} = L_{20}$). Further, the height of the shaft pins 17 relative to the base parts 12a of the fixed frames 12 and the height of the link shaft 26 relative to the base parts 12a of the fixed frames 12 (indicated by arrow ΔL in FIG. 5A) are also determined to be equal.

Further, according to this embodiment, the first link arms 18 are provided with respective hinge units 30 (a second semiautomatic mechanism recited in the claims). These hinge units 30 are provided to be coaxial with the shaft pins 17 that receive the lower end portions of the first link arms 18. According to this embodiment, a case is illustrated where the first link arms 18 (the shaft pins 17) are provided with the hinge units 30, while the second link arms 20 (the link shaft 26) may be provided with the hinge units 30.

The hinge units 30 include a head cam, a slide cam, and a hinge spring in a hinge case (individual components do not appear in the drawings). Projecting surfaces and depressed surfaces that fit each other are formed on contact surfaces of the head cam and the slide cam. These hinge units 30 are configured so that no rotational torque is generated at a position where the vertex parts of the respective projecting surfaces of the cams come into contact with each other (referred to as a reversing position) while a rotational torque is generated between the cams by the elastic forces of the hinge spring once the projecting parts are out of the reversing position.

The movable plate 14 is caused to rotationally move by the turns of the first link arms 18 and the second link arms 20. According to this embodiment, the reversing position of the cams is determined to be a position in the middle of this rotational movement. Specifically, the position illustrated in FIG. 5C (where the arms 18 and 20 are inclined 30° in the counterclockwise direction relative to a vertical direction) is determined to be the reversing position of the hinge units 30.

Figure 5C:
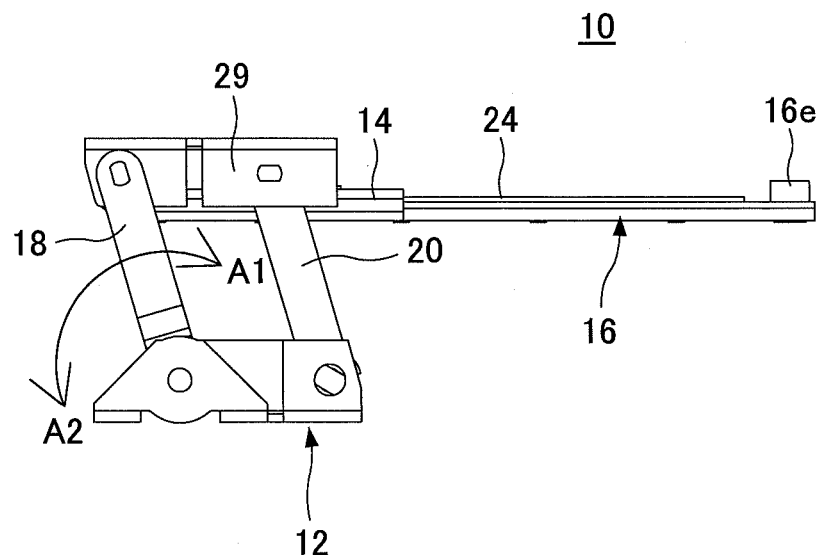
FIG. 5C is a diagram for illustrating the operation of the opening and closing device that is an embodiment of the present invention, and is a side view illustrating the state where the slide plate is at the second intermediate position.
Figure 5D:
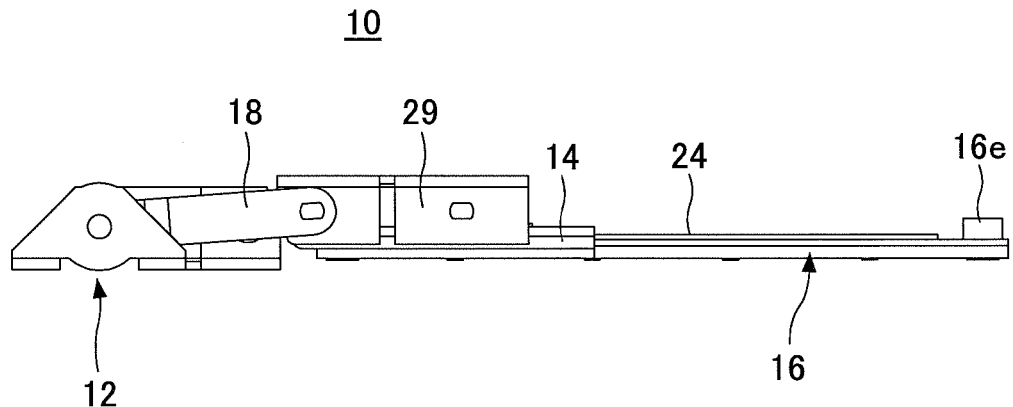
FIG. 5D is a diagram for illustrating the operation of the opening and closing device that is an embodiment of the present invention, and is a side view illustrating the open state of the slide plate.

Accordingly, when the first and second link arms 18 and 20 are positioned counterclockwise relative to the reversing position (the position illustrated in FIG. 5C), the first and second link arms 18 and 20 are turned and urged in a direction indicated by arrow A2 in FIG. 5C (a backward direction) by the hinge units 30. On the other hand, after the first and second link arms 18 and 20 rotationally move slightly in arrow A1 from the reversing position, the urging forces of the hinge units 30 are reversed, so that the first and second link anus 18 and 20 are turned and urged in the direction of arrow A1 (a forward direction). Therefore, the hinge units 30 having the above-described configuration form so-called cam-type semiautomatic hinges.

Next, a description is given of specific operations of the opening and closing device 10 of the above-described configuration and the electronic apparatus 1 to which the opening and closing device 10 is applied. FIGS. 4A through 4D, 5A through 5D, 6A through 6D, and 7A through 7D illustrate the second housing 3 and the slide plate 16 moving from the closed state to the open state.

FIG. 4A, FIG. 5A, FIG. 6A, and FIG. 7A (hereinafter, the illustrations of these drawings are indicated briefly as FIG. 4A through FIG. 7A) illustrate the opening and closing device 10 and the electronic apparatus 1 in the closed state. In this closed state, the second housing 3 of the electronic apparatus 1 is superposed on top of the first housing 2 as illustrated in FIG. 7A.

Further, in the closed state, the first and second link arms 18 and 20 of the opening and closing device 10 are turned in the counterclockwise direction in the drawings (the direction indicated by arrow A2 in FIG. 5A) about the shaft pins 17 and the link shaft 26 as illustrated in FIG. 4A through FIG. 6A. At this point, the hinge units 30 urge the first and second link arms 18 and 20 in the counterclockwise direction (the A2 direction or the backward direction).

Figure 4A:
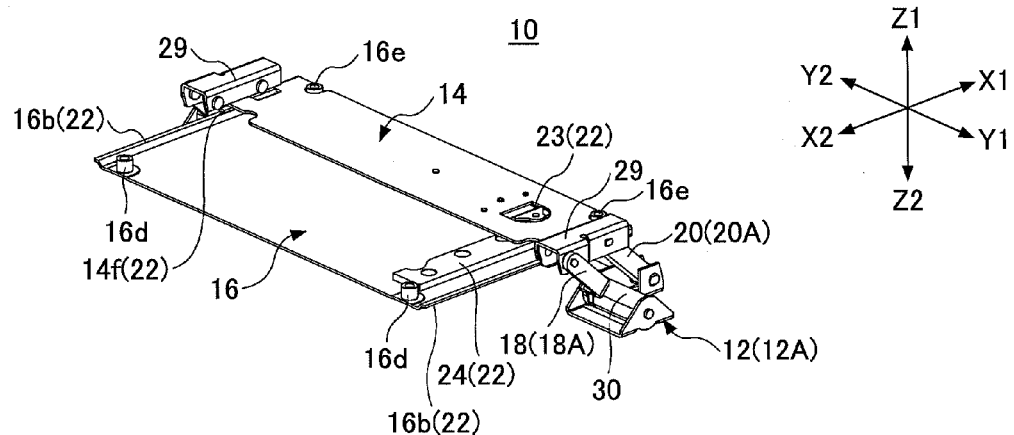
FIG. 4A is a diagram for illustrating an operation of the opening and closing device that is an embodiment of the present invention, and is a perspective view illustrating a closed state of a slide plate.
Figure 4B:
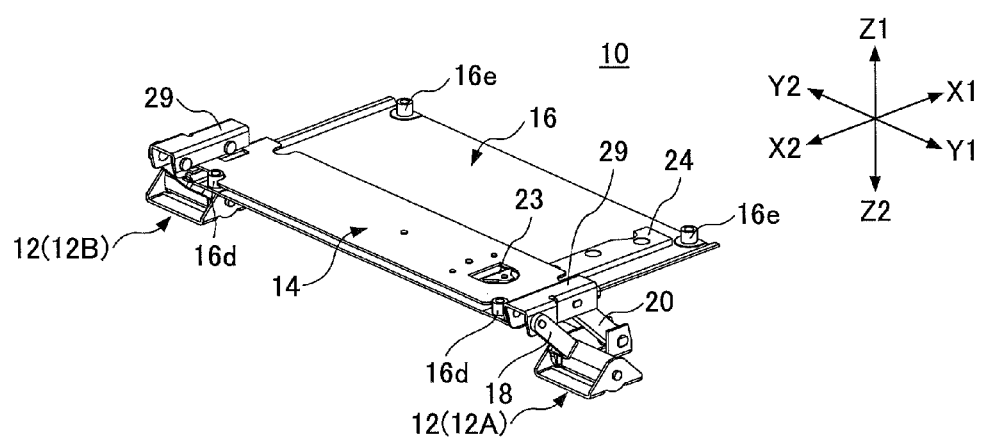
FIG. 4B is a diagram for illustrating the operation of the opening and closing device that is an embodiment of the present invention, and is a perspective view illustrating a state where the slide plate is at a first intermediate position.
Figure 4C:
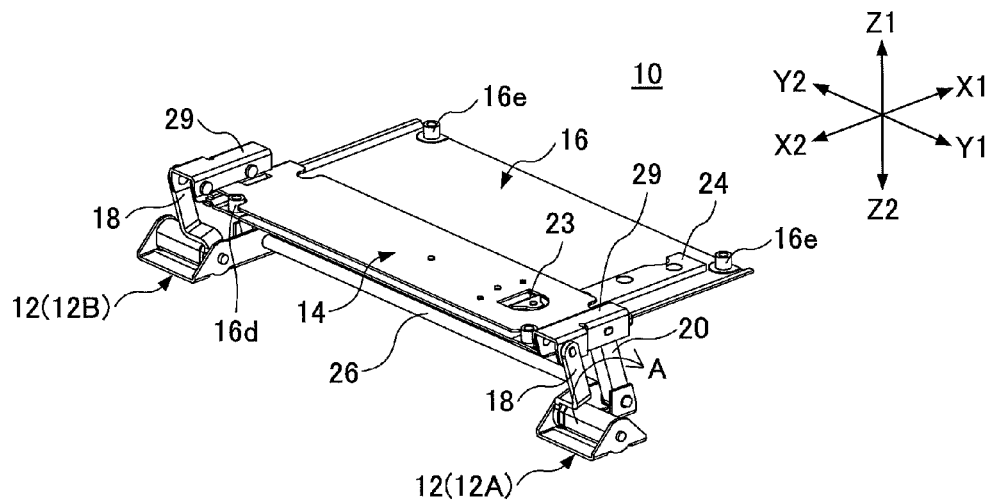
FIG. 4C is a diagram for illustrating the operation of the opening and closing device that is an embodiment of the present invention, and is a perspective view illustrating a state where the slide plate is at a second intermediate position.
Figure 4D:
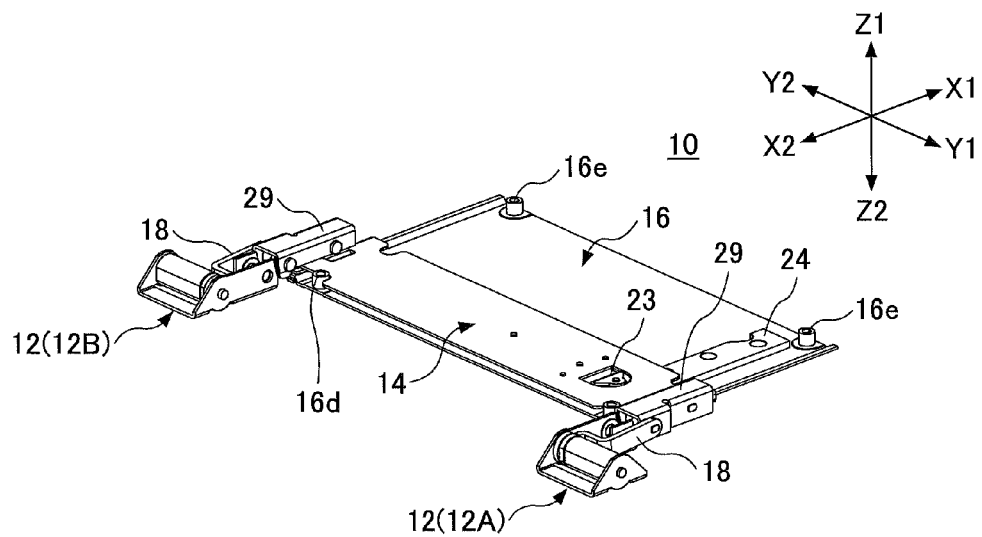
FIG. 4D is a diagram for illustrating the operation of the opening and closing device that is an embodiment of the present invention, and is a perspective view illustrating an open state of the slide plate.
Figure 6A:
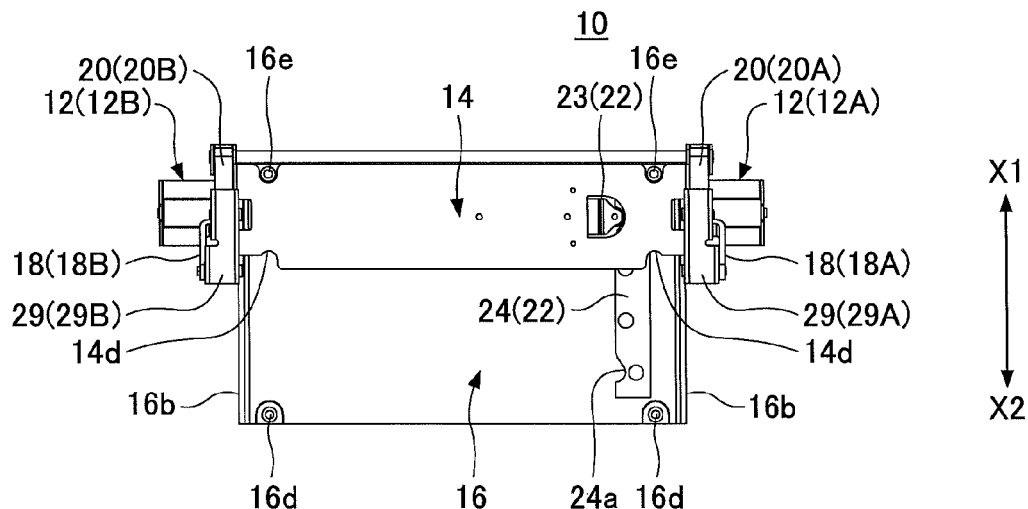
FIG. 6A is a diagram for illustrating an operation of the opening and closing device that is an embodiment of the present invention, and is a plan view illustrating the closed state of the slide plate.
Figure 6B:
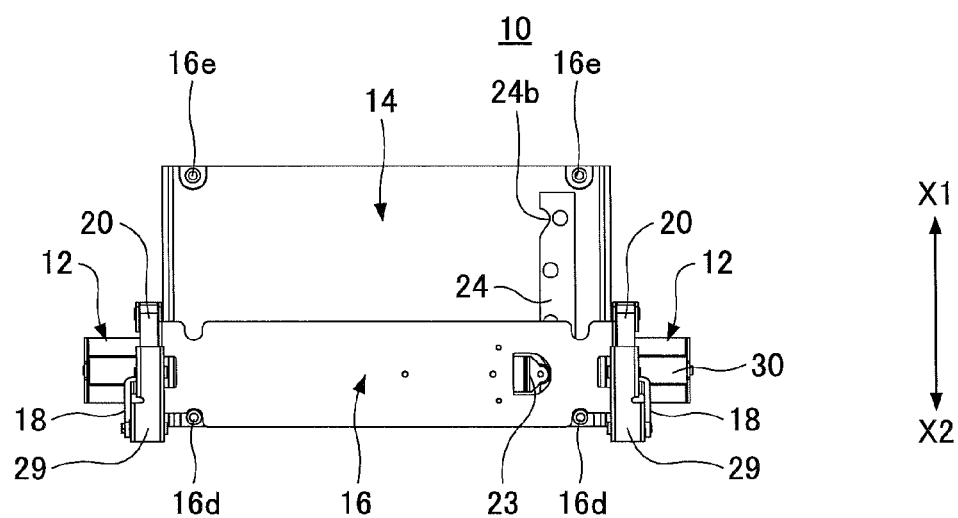
FIG. 6B is a diagram for illustrating the operation of the opening and closing device that is an embodiment of the present invention, and is a plan view illustrating the state where the slide plate is at the first intermediate position.
Figure 6C:
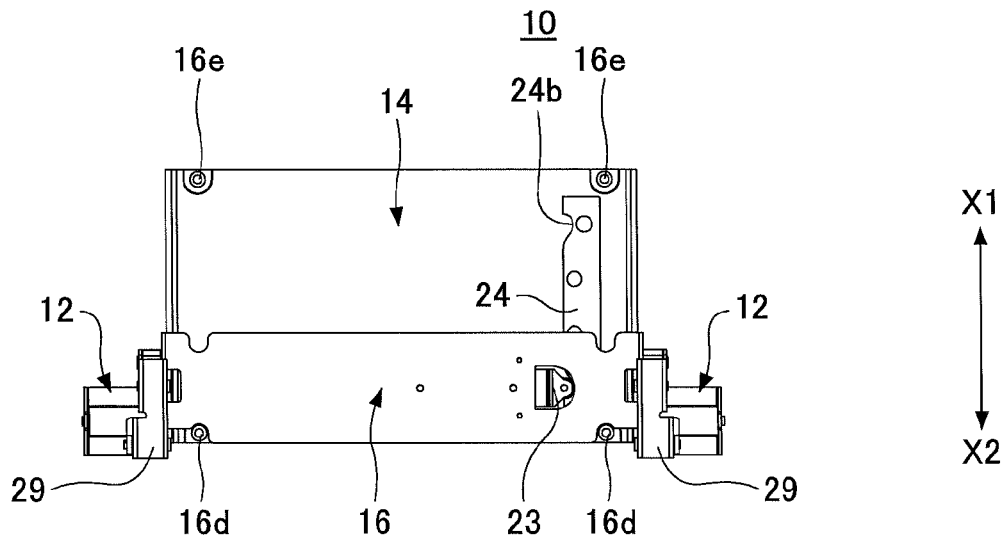
FIG. 6C is a diagram for illustrating the operation of the opening and closing device that is an embodiment of the present invention, and is a plan view illustrating the state where the slide plate is at the second intermediate position.
Figure 6D:
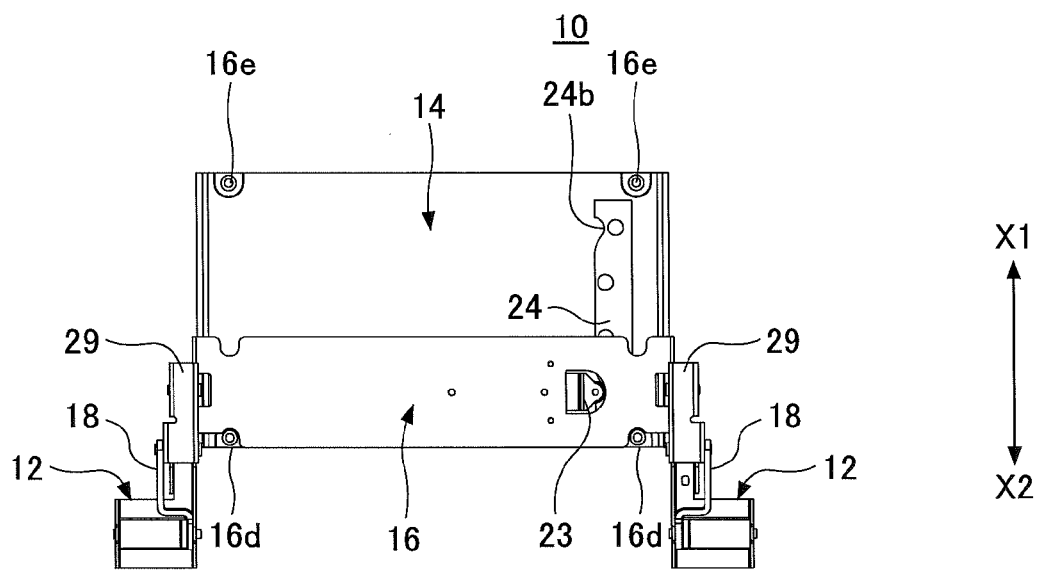
FIG. 6D is a diagram for illustrating the operation of the opening and closing device that is an embodiment of the present invention, and is a plan view illustrating the open state of the slide plate.

Further, in the closed state, the slide plate 16 is slid in the X2 direction relative to the movable plate 14. Therefore, as illustrated in FIG. 4A and FIG. 6A, the stopper grooves 14e are in contact with the stoppers 16e, and the roller 28 of the spring unit 23 is engaged with the cam groove 24b of the cam plate 24. Thus, the stopper grooves 14e and the stoppers 16e come into contact with each other and the roller 28 engages with the cam groove 24b to press the cam groove 24b in the Y1 direction, thereby preventing the backlash of the slide plate 16 relative to the movable plate 14.

In order to move the slide plate 16 (the second housing 3) from the above-described closed position to the open position, first, the slide plate 16 is caused to slide in the X1 direction relative to the movable plate 14. Specifically, an operator moves and urges the slide plate 16 (the second housing 3) in the direction of arrow X1. Further, the slide grooves 14f and the slide parts 16b of the slide mechanism 22 are configured to be slidable.

Therefore, by moving and urging the slide plate 16 (the second housing 3), the roller 28 of the spring unit 23 is disengaged from the cam groove 24b, so that the slide plate 16 starts to move in the direction of arrow X1. In this moving and urging, a force to turn the movable plate 14 relative to the fixed frames 12 is exerted. However, a rotational torque caused by this moving and urging force due to the operator is smaller than a rotational torque generated by the hinge units 30.

As described above, when the slide plate 16 slides relative to the movable plate 14, the roller 28 of the spring unit 23 is pressed against the cam surface 24c. Therefore, there is no backlash of the slide plate 16 relative to the movable plate 14 at the time of sliding of the slide plate 16.

When the slide plate 16 slides in the X1 direction, the roller 28 of the spring unit 23 eventually engages with the cam groove 24a. Further, the stopper grooves 14d engage with the stoppers 16d so as to prevent a further slide of the slide plate 16. When this roller 28 engages with the cam groove 24a, it is possible for the operator to feel this engagement as the feeling of a click. Therefore, it is possible for the operator to know that the slide plate 16 has moved to a predetermined position in the X1 direction by this feeling of a click.

FIG. 4B through FIG. 7B illustrate the state of the slide plate 16 where the roller 28 is engaged with the cam groove 24a and the stopper grooves 14d are engaged with the stoppers 16d as described above. Hereinafter, the position of the opening and closing device 10 and its individual components illustrated in FIG. 4B through FIG. 7B are referred to as a first intermediate position.

When the movable plate 14 (the slide plate 16) is operated to move from this first intermediate position toward the open position against the urging forces of the hinge units 30, the second housing 3 is separated from the first housing 2 to move toward the open position as illustrated in FIG. 7C. With this, the first link arms 18 start to turn clockwise (in the A1 direction) on the shaft pins 17, and at the same time, the second link arms 20 start to turn clockwise (in the A1 direction) on the link shaft 26.

At this point, according to this embodiment, the fixed frames 12A and 12B are spaced apart in the Y1 and the Y2 direction, and the first link arms 18A and 18B and the second link arms 20A and 20B are spaced apart in the Y1 and the Y2 direction. However, the second link arm 20A and the second link arm 20B are connected by the link shaft 26. This causes the turn of the second link arms 20A and the turn of the second link arm 20B to be in synchronization with each other, thus allowing the second link arms 20A and 20B to make the same turn.

Further, as described above, the first and second link arms 18 and 20 are equal in length ($L_{18} = L_{20}$), and the link arms 18 and 20 are provided parallel to each other between the fixed frames 12 and the movable plate 14 (the connecting members 29). Therefore, when the first and second link arms 18 and 20 turn, the movable plate 14 and the slide plate 16 move while being kept parallel to the fixed frames 12.

FIG. 4C through FIG. 7C illustrate a state where the first link arms 18 have been moved to the reversing position by the operation of moving the movable plate 14 to the open position. Hereinafter, the position of the opening and closing device 10 and its individual components illustrated in FIG. 4C through FIG. 7C are referred to as a second intermediate position.

As described above, at the reversing position, the head cams and the slide cams of the hinge units 30 have the vertex parts of their respective projecting surfaces in contact with each other. At this reversing position, rotational urging forces for the first link arms 18 due to the hinge units 30 are momentarily lost. Then, by operating the movable plate 14 (the second housing 3) further toward the open position from this reversing position, the rotational torques generated by the hinge units 30 are reversed to rotationally urge the first link arms 18 in a direction to cause the movable plate 14 to move toward the open position.

As a result, after the second intermediate position, the first link arms 18 are rotationally urged clockwise (in the A1 direction or the open direction) about the shaft pins 17. Accordingly, after operating the movable plate 14 slightly toward the open position from the reversing position, the movable plate 14 (the slide plate 16 and the second housing 3) automatically moves rotationally toward the open position.

FIG. 4D through FIG. 7D illustrate a state where the movable plate 14 (the slide plate 16 and the second housing 3) has moved to the open position. The upper surface 2a of the first housing 2 and the upper surface 3a of the second housing 3 become flat (the upper surfaces 2a and 3a are in the same plane) when the movable plate 14 and the slide plate 16 have moved to the open position. Therefore, in the open position, the entire upper surface 2a of the first housing 2 and the entire upper surface 3a of the second housing 3 are exposed without an overlap between the first housing 2 and the second housing 3. Therefore, it is possible to make effective use of the space of each of the housings 2 and 3.

The operation and movements of causing the slide plate 16 and the movable plate 14 (the second housing 3) to move from the open state illustrated in FIG. 4D through FIG. 7D to the closed position illustrated in FIG. 4A through FIG. 7A are opposite to the above-described operation and movements, and a description thereof is therefore omitted.

As described above, in the opening and closing device 10 according to this embodiment, when the movable plate 14 and the slide plate 16 move between the open position and the closed position, the movable plate 14 and the slide plate 16 move while being kept parallel to the fixed frames 12 (the base parts 12a). Accordingly, compared with a configuration where a movable plate and a slide plate change their directions to those other than parallel directions with their movements, it is possible to improve the stability of the opening and closing operations.

Further, by causing the plates 14 and 16 to move while keeping a parallel state, it is possible to limit the direction of the operator's operation of the plates 14 and 16 at the time of the opening operation to a parallel direction (the X1 direction). Therefore, it is possible to improve the operability of the opening and closing device 10 at the time of opening.

Further, as described above, according to this embodiment, the roller 28 of the spring unit 23 presses the cam plate 24 in the Y1 direction. Therefore, it is possible to prevent occurrence of backlash in the slide plate 16 also in the case of causing the slide plate 16 to slide relative to the movable plate 14.

Further, according to this embodiment, the slide plate 16 fixed to the second housing 3 is caused to slide relative to the movable plate 14 caused to rotationally move by the first and second link arms 18 and 20. Therefore, it is possible to simplify the structures of the link arms 18 and 20 at their respective connecting positions (where the link arms 18 and 20 are received), so that it is possible for the opening and closing device 10 to have a compact configuration.

Figure 8:
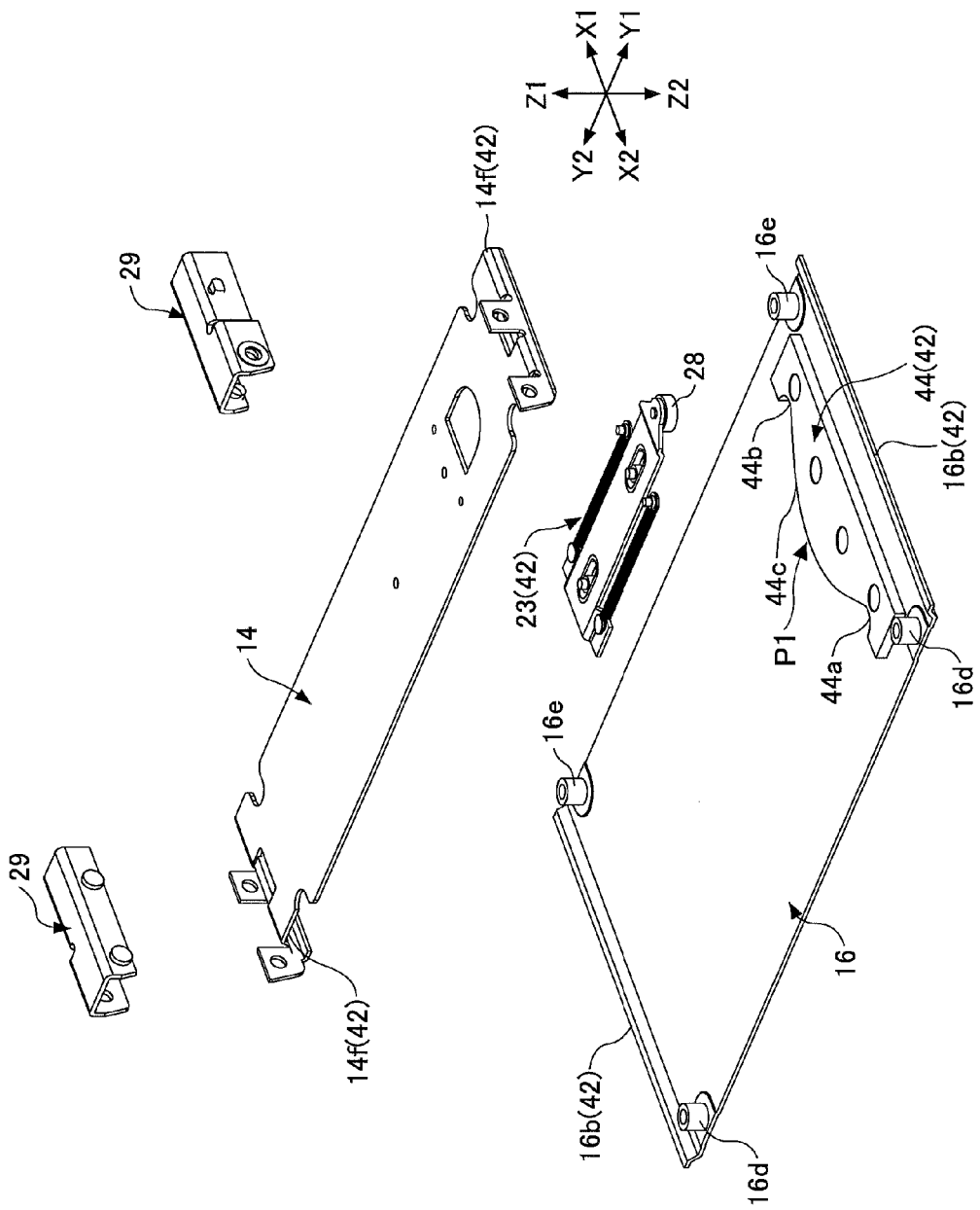
FIG. 8 is an exploded perspective view for illustrating a first variation of the slide mechanism of the opening and closing device that is an embodiment of the present invention.
Figure 9:
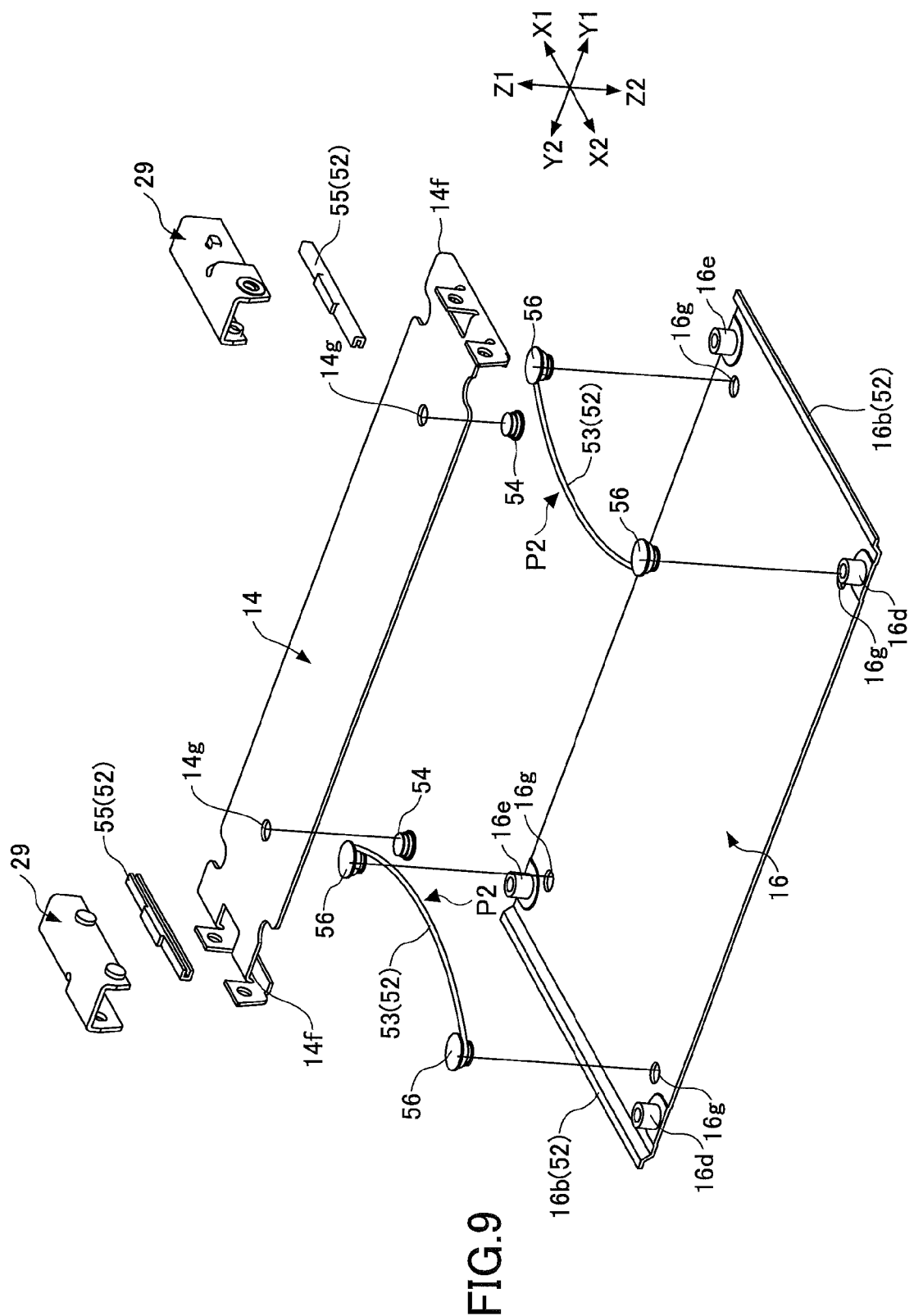
FIG. 9 is an exploded perspective view for illustrating a second variation of the slide mechanism of the opening and closing device that is an embodiment of the present invention.
Figure 10:
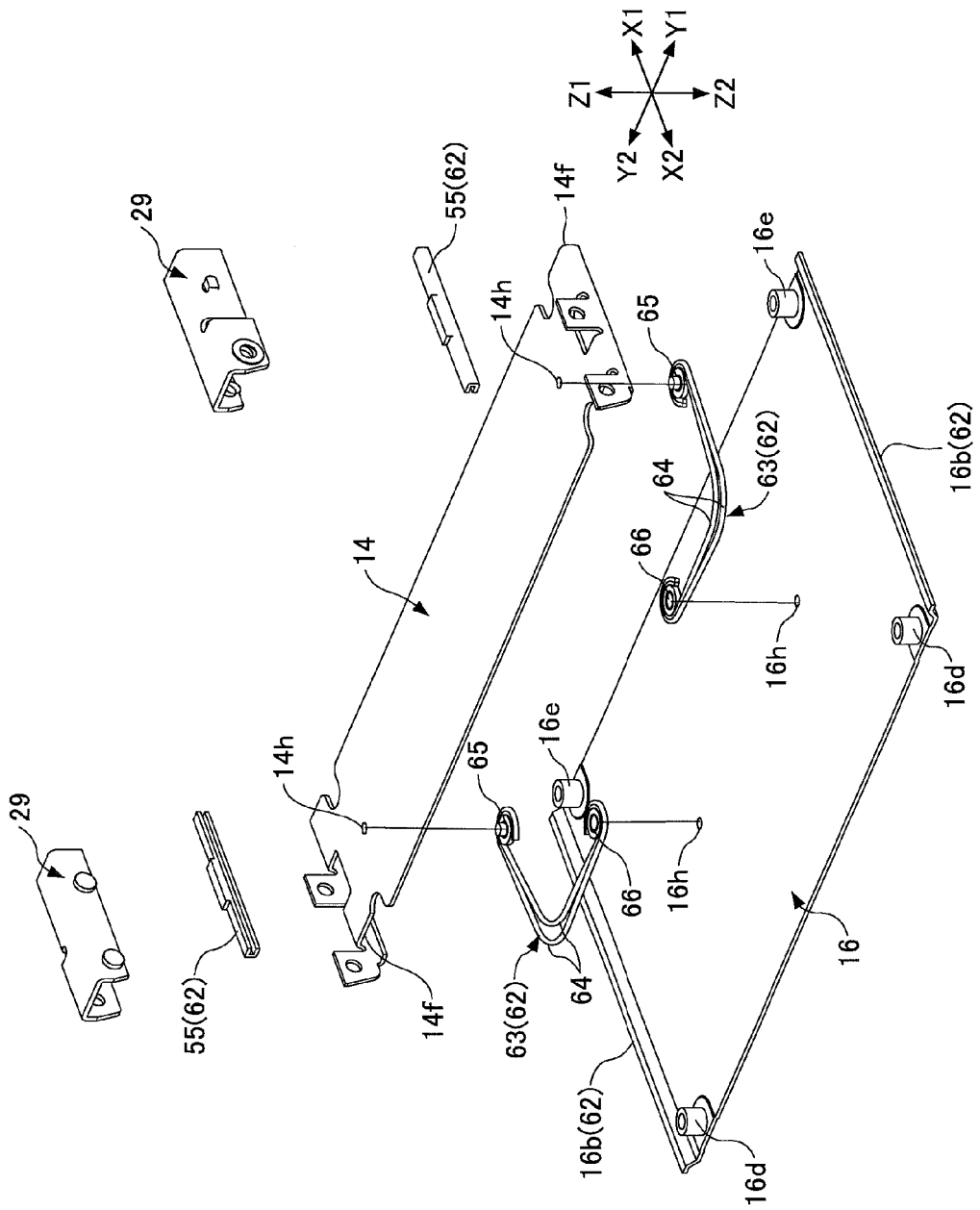
FIG. 10 is an exploded perspective view for illustrating a third variation of the slide mechanism of the opening and closing device that is an embodiment of the present invention.

Next, a description is given, using FIG. 8 through FIG. 10, of variations of the above-described slide mechanism 22.

According to the above-described slide mechanism 22, when the slide plate 16 is caused to slide relative to the movable plate 14, the entire operation of causing the slide plate 16 to move between the closed position and the first intermediate position is manually performed by an operator.

In contrast, slide mechanisms 42, 52, and 62 according to first through third variations illustrated in FIG. 8 through FIG. 10 have a feature of including a mechanism that applies an urging force in the backward direction until the slide plate 16 is slid from the closed position or the first intermediate position to a predetermined reversing position and applies an urging force in the forward direction once the slide plate 16 passes this reversing position (a first semiautomatic mechanism recited in the claims). In FIG. 8 through FIG. 10, configurations corresponding to the configurations illustrated in FIG. 1 through FIG. 7D are given the same symbols, and a description thereof is omitted.

FIG. 8 illustrates the slide mechanism 42 that is the first variation. This slide mechanism 42 is similar in configuration to the above-described slide mechanism 22. However, while the cam surface 24c of the cam plate 24 has a flat, linear shape in the slide mechanism 22, the slide mechanism 42 according to this embodiment has a feature that a cam plate 44 includes a projecting cam surface 44c that projects in the direction of arrow Y2 between a cam groove 44a and a cam groove 44b.

According to this variation, the top position (the position indicated by arrow P1 in the drawing) of the projecting cam surface 44c is the reversing position. Here, it is assumed that the slide plate 16 is caused to slide in the X1 direction relative to the movable plate 14. In this case, when the roller 28 of the spring unit 23 is between the cam groove 44b and the reversing position P1, the slide plate 16 is urged toward the X2 direction (toward the closed position) by the urging force of the spring unit 23.

However, when the operator moves the slide plate 16 to a position beyond the reversing position P1, the roller 28 thereafter presses the curved-surface cam surface 44c between the reversing position P1 and the cam groove 44a, so that the slide plate 16 automatically slides in the X1 direction. Therefore, the configuration of this variation makes it possible to improve the operability of the slide plate 16 at the time of sliding.

FIG. 9 illustrates the slide mechanism 52 that is the second variation. The slide mechanism 52 has a feature of including bow-shaped wire springs 53 provided one on each side part (each of side parts on the Y1 and the Y2 direction side) of the slide plate 16 and rollers 54 provided on the movable plate 14.

The paired wire springs 53 are formed of a spring wire material and are curved to project inward. The paired wire springs 53 are fixed to the slide plate 16 by having their respective end portions fixed to attachment holes 16g with fixing pins 56. Further, the rollers 54 are rotatably fixed to attachment holes 14g formed in the movable plate 14. Further, the rollers 54 are configured to constantly engage with the wire springs 53 from their inside when the slide plate 16 slides in the X1 and the X2 direction relative to the movable plate 14.

According to this variation, the top positions (the positions indicated by arrows P2 in the drawing) of the bow-shaped wire springs 53 are the reversing positions. It is assumed that the slide plate 16 is caused to slide in the X1 direction relative to the movable plate 14 the same as in the first variation. In this case, when the rollers 54 are between the fixing pins 56 on the side of the direction of arrow X1 and the reversing positions P2, the slide plate 56 is urged toward the X2 direction (toward the closed position) by the elastic forces of the wire springs 53.

However, when the operator moves the slide plate 16 to a position beyond the reversing positions P2, the rollers 54 thereafter come into contact with the wire springs 53 between the reversing positions P2 and the fixing pins 56 on the side of the direction of arrow X2, so that the slide plate 16 is caused to slide in the X1 direction by the resilience of the wire springs 53. Therefore, according to the configuration of this variation as well, it is possible to improve the operability of the slide plate 16 at the time of sliding.

FIG. 10 illustrates the slide mechanism 62 that is the third variation. This slide mechanism 62 has a feature of including spring units 63 provided between the movable plate 14 and the slide plate 16. The spring units 63 include fixing members 65 and 66 provided at end portions of multiple wire springs 64.

The wire springs 64 are bent into a substantially dogleg shape. Each of the wire springs 64 has one end portion welded to the fixing member 65 and has another end portion fixed to the fixing member 66 by welding. The fixing members 65 are fixed to fixing holes 14h of the movable plate 14, and the fixing members 66 are fixed to fixing holes 16h of the slide plate 16.

According to this variation, a position at which the fixing members 65 and the fixing members 66 are aligned in the Y1 and the Y2 direction with a slide of the slide plate 16 is the reversing position. It is assumed that the slide plate 16 is caused to slide in the X1 direction relative to the movable plate 14 the same as in each of the above-described variations. In this case, the slide plate 16 is urged toward the X2 direction (toward the closed position) by the elastic forces of the spring units 63 until the slide plate 16 reaches the reversing position.

However, when the operator moves the slide plate 16 to a position beyond the reversing position, the elastic forces due to the spring units 63 are thereafter reversed, so that the slide plate 16 slides in the X1 direction. Therefore, according to the configuration of this variation as well, it is possible to improve the operability of the slide plate 16 at the time of sliding.

In the second and the third variation, the spring unit 23 is not provided, so that no force to urge the slide plate 16 in the Y1 direction with the spring unit 23 is exerted. Therefore, there may be a backlash of the slide plate 16 relative to the movable plate 14. However, in the second and the third variation, the occurrence of backlash between the slide grooves 14f and the slide parts 16b is prevented by providing the slide grooves 14f with resin slide guides 55.

While a detailed description is given above of the preferred embodiments of the present invention, the present invention is not limited to the above-described specific embodiments, and variations and modifications may be made within the gist of the present invention recited in the claims.

The present international application claims priority based on Japanese Patent Application No. 2010-167444, filed on Jul. 26, 2010, the entire contents of which are incorporated herein by reference.

The invention claimed is:

1. An opening and closing device, comprising:
   a fixed frame including a shaft receiving part and fixed to a first housing;
   a movable plate configured to be coupled to and rotationally movable relative to the fixed frame;
   a slide plate configured to be slidable relative to the movable plate and fixed to a second housing;
   a plurality of arms of a same length provided between the shaft receiving part and the movable plate to have respective one ends pivotally received by the shaft receiving part and respective other ends pivotally received by the movable plate; and
   a slide mechanism coupled between the movable plate and the slide plate, said slide mechanism configured to cause the slide plate to slide relative to the movable plate,
   wherein the slide plate is caused to slide relative to the movable plate by the slide mechanism and the movable plate rotates relative to the fixed frame with turns of the arms, so that the second housing moves between a closed position where the second housing is superposed on the first housing and an open position where an upper surface of the second housing and an upper surface of the first housing are in a same plane, and
   wherein the slide mechanism includes a first semiautomatic mechanism configured to apply an urging force to the slide plate in a first backward direction until sliding the slide plate from an initial slide start position to a predetermined first intermediate reversing position and to apply an urging force to the slide plate in a first forward direction once the slide plate passes the first intermediate reversing position.

2. The opening and closing device as claimed in claim 1, wherein the arms are provided parallel to each other between the shaft receiving part and the movable plate.

3. The opening and closing device as claimed in claim 1, wherein at least one of the arms is provided with a second semiautomatic mechanism configured to apply an urging force to said at least one arm in a second backward direction until turning the arms from the closed position or the open position to a predetermined second intermediate reversing position and to apply an urging force to said at least one arm in a second forward direction once the arms pass the second intermediate reversing position.

* * * * *